US007387469B2

(12) United States Patent
Duggan

(10) Patent No.: US 7,387,469 B2
(45) Date of Patent: Jun. 17, 2008

(54) BEND STIFFENER

(75) Inventor: John Malachy Duggan, Ormskirk (GB)

(73) Assignee: Trelleborg CRP Ltd., Lancashire (GB)

( * ) Notice: Subject to any disclaimer, the term of this patent is extended or adjusted under 35 U.S.C. 154(b) by 226 days.

(21) Appl. No.: 11/066,107

(22) Filed: Feb. 25, 2005

(65) Prior Publication Data
US 2005/0194782 A1 Sep. 8, 2005

(30) Foreign Application Priority Data
Feb. 27, 2004 (GB) ................. 0404349.3

(51) Int. Cl.
*E21B 17/01* (2006.01)
(52) U.S. Cl. .................................... 405/211
(58) Field of Classification Search ............. 405/211, 405/168.1, 168.2, 169, 170; 285/411, 414, 285/415, 367; 138/120, 155; 403/289, 338, 403/331, 286, 293, 303, 341
See application file for complete search history.

(56) References Cited
U.S. PATENT DOCUMENTS 3,578,233 A * 5/1971 Meister et al. ............... 228/5.1
3,752,509 A * 8/1973 Stafford .................... 285/334.4
4,655,483 A * 4/1987 Margotta ............... 285/148.28
6,220,303 B1 4/2001 Secher et al. ............... 138/110

FOREIGN PATENT DOCUMENTS
EP 0 859 182 10/2000
GB 2291686 1/1996
WO WO 2005/095198 * 10/2005

OTHER PUBLICATIONS
Great Britain Patent Office, "Patents Act 1977: Search Report under Section 17," Jul. 12, 2004, 1 page.

* cited by examiner

*Primary Examiner*—Sunil Singh
(74) *Attorney, Agent, or Firm*—Meyertons, Hood, Kivlin, Kowert & Goetzel, P.C.; Eric B. Meyertons

(57) ABSTRACT

A bend stiffener 2 is disclosed for preventing excessive bending of an elongate member, e.g. a marine riser, in a region where it enters a tube, e.g. an "I" or "J" tube mounted on a hydrocarbon extraction platform. The bend stiffener has an elongate sleeve 8 having a through-going cavity which receives the elongate member in use. The sleeve is to be mounted by means of (i) a mating part 18 received by the tube and (ii) an axial locating arrangement 6, 12, 14, 16. The axial locating arrangement is designed to permit at least some angular movement. As a result bending moments are borne by the engagement of the mating part 18 with the tube. The axial locating arrangement does not suffer large bending moments and so problems of fatigue in this area are alleviated.

10 Claims, 10 Drawing Sheets

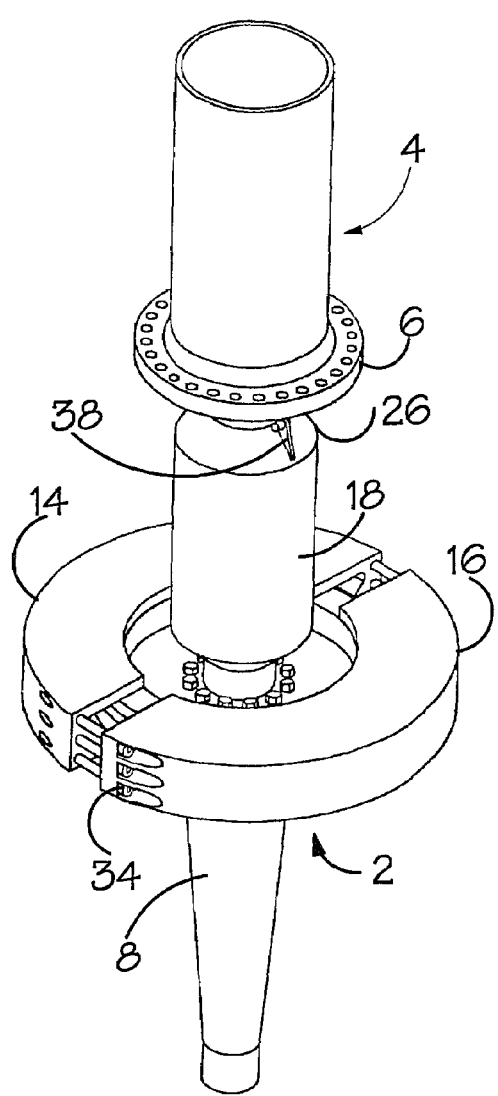
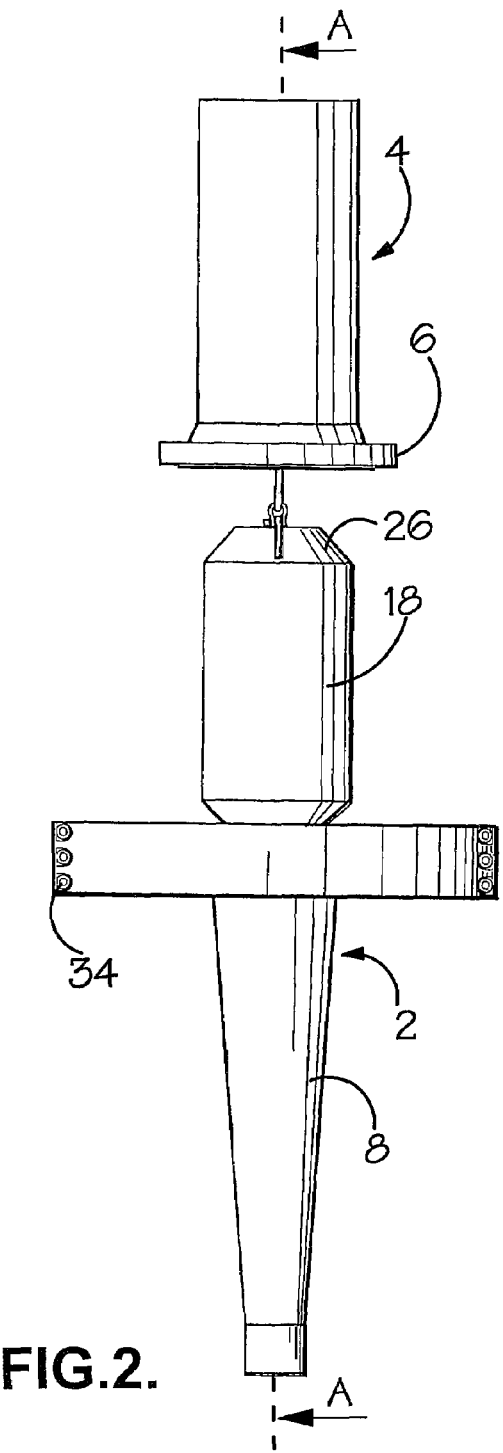
FIG.1.
FIG.2.

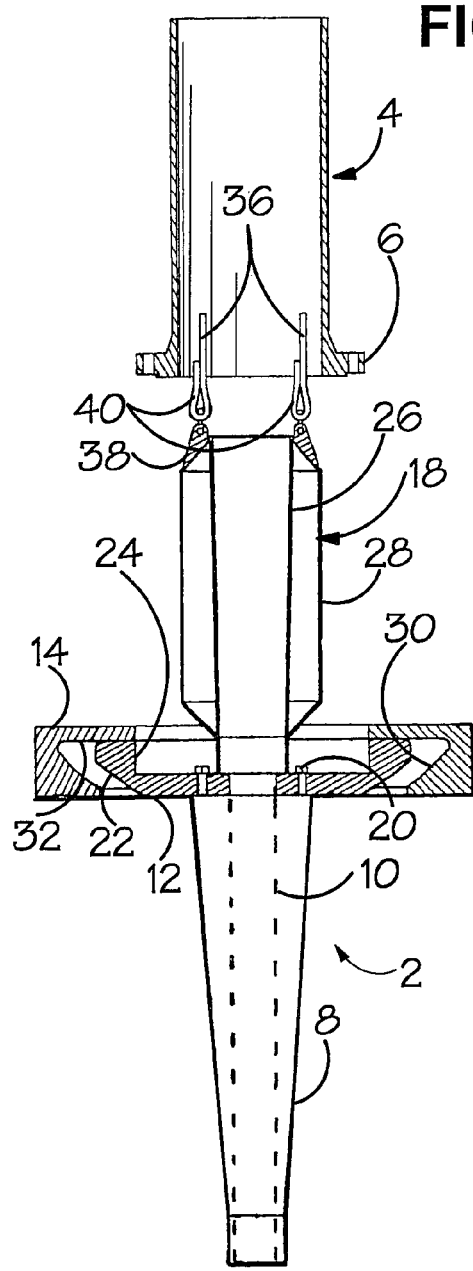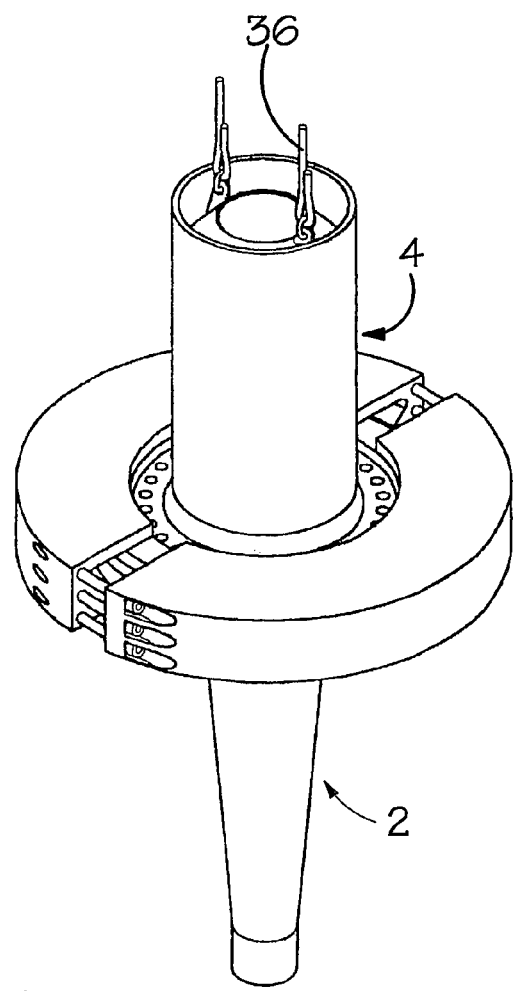

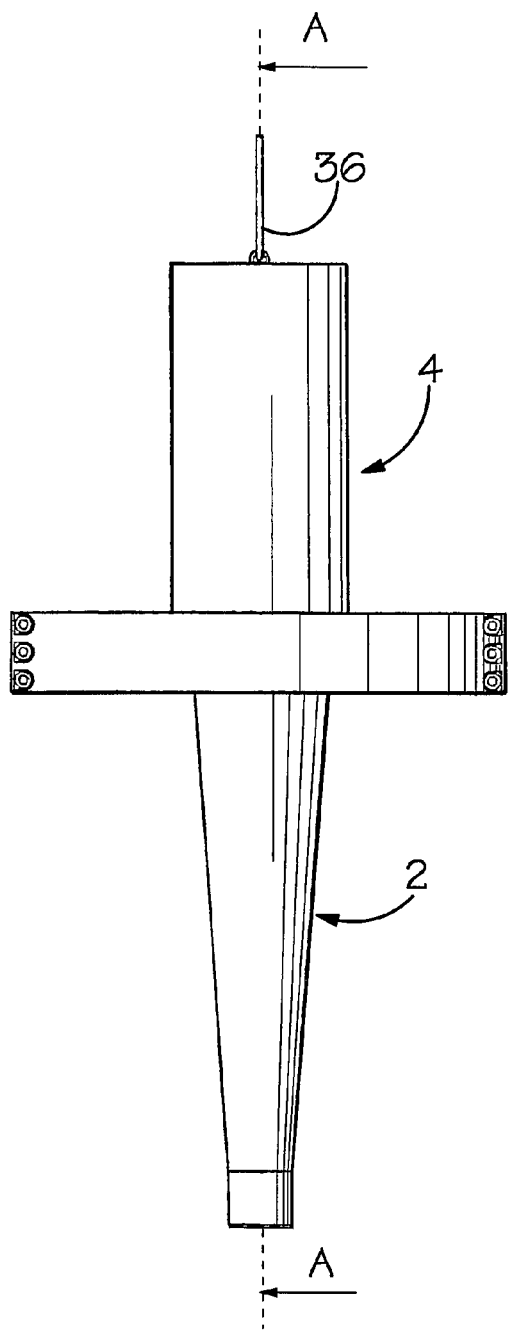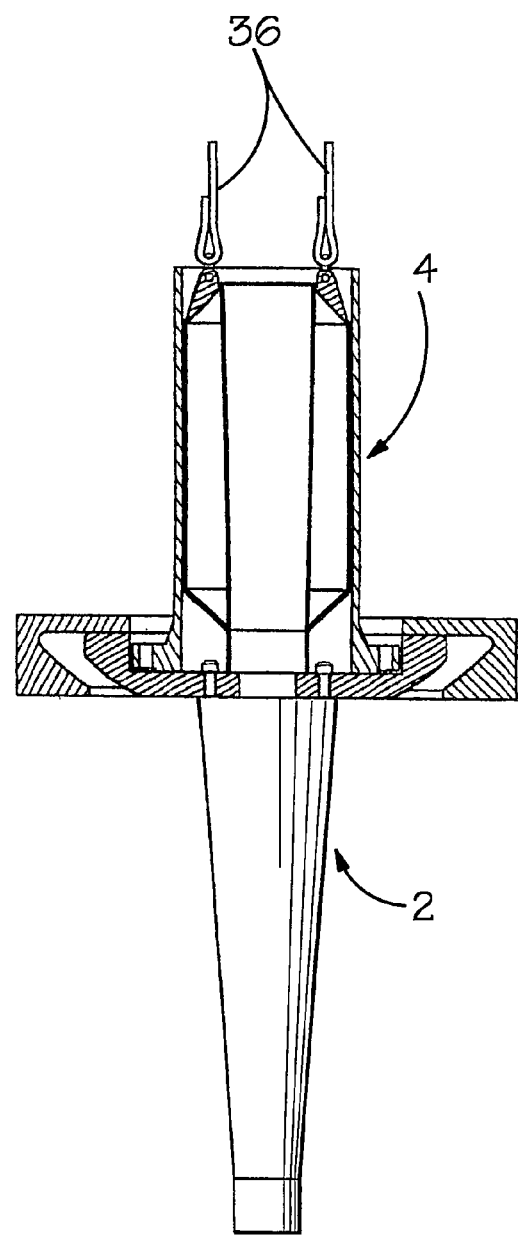
FIG.5.  FIG.6.

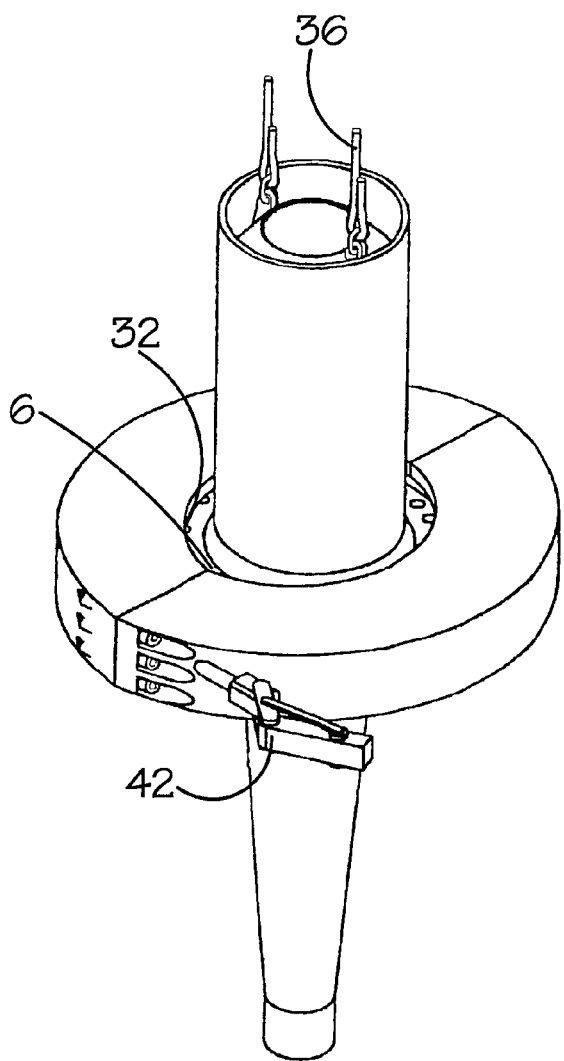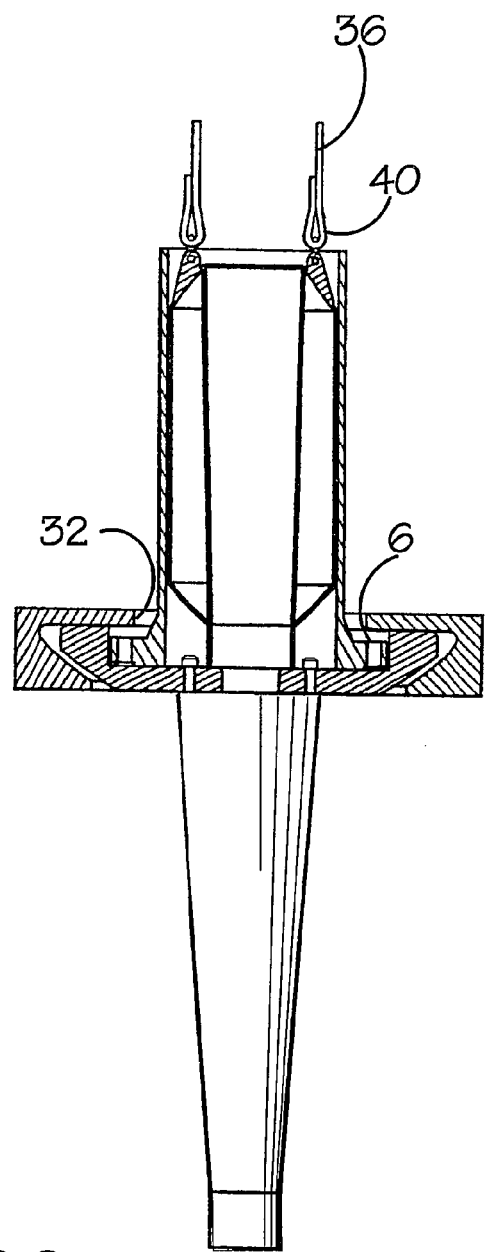
FIG.7.
FIG.8.

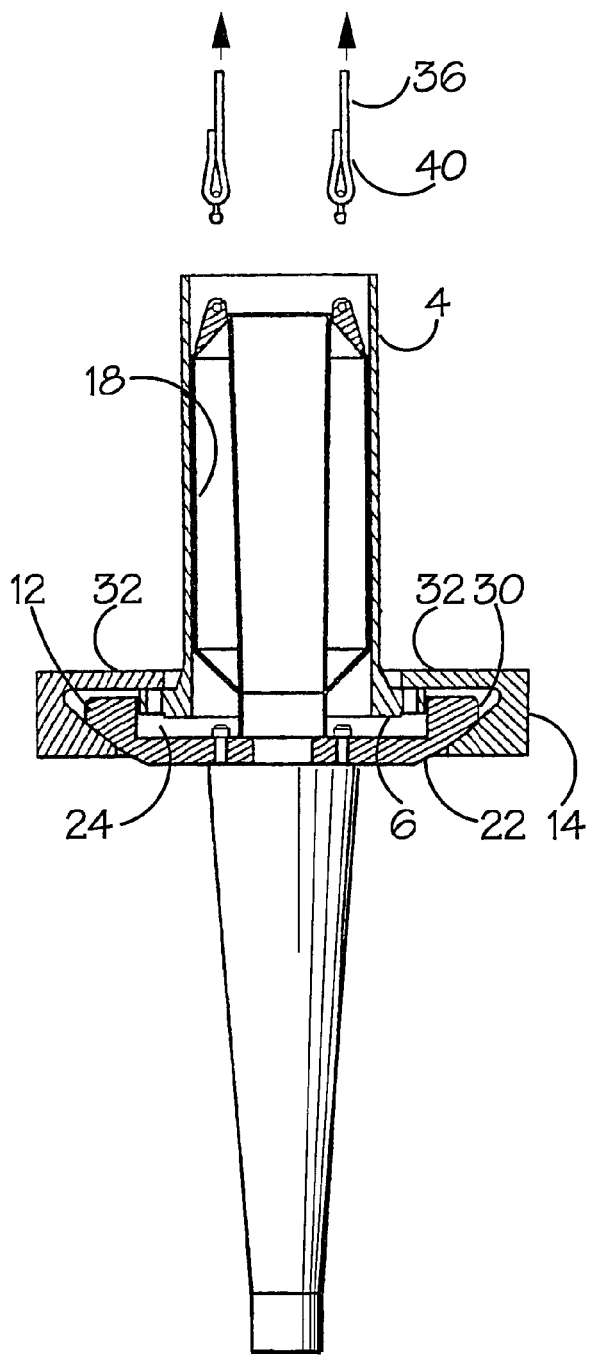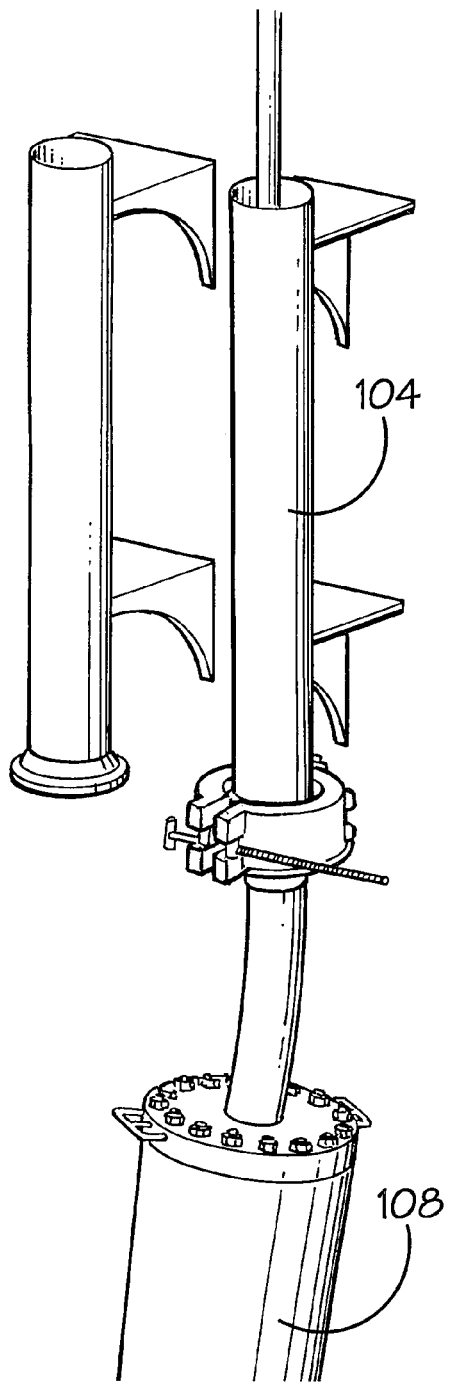
FIG.9.
FIG.10.

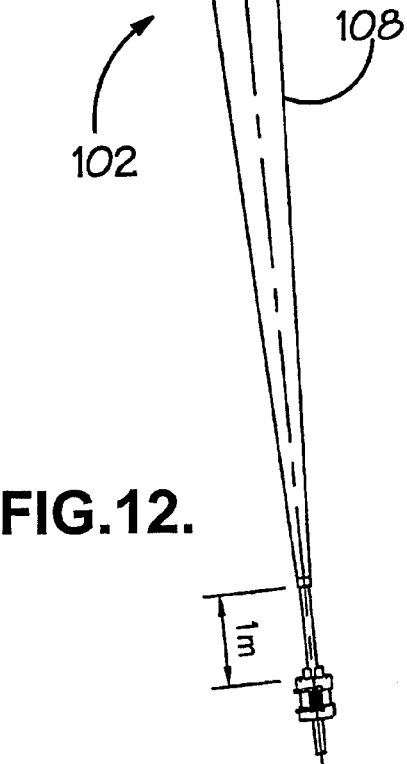
FIG.12.
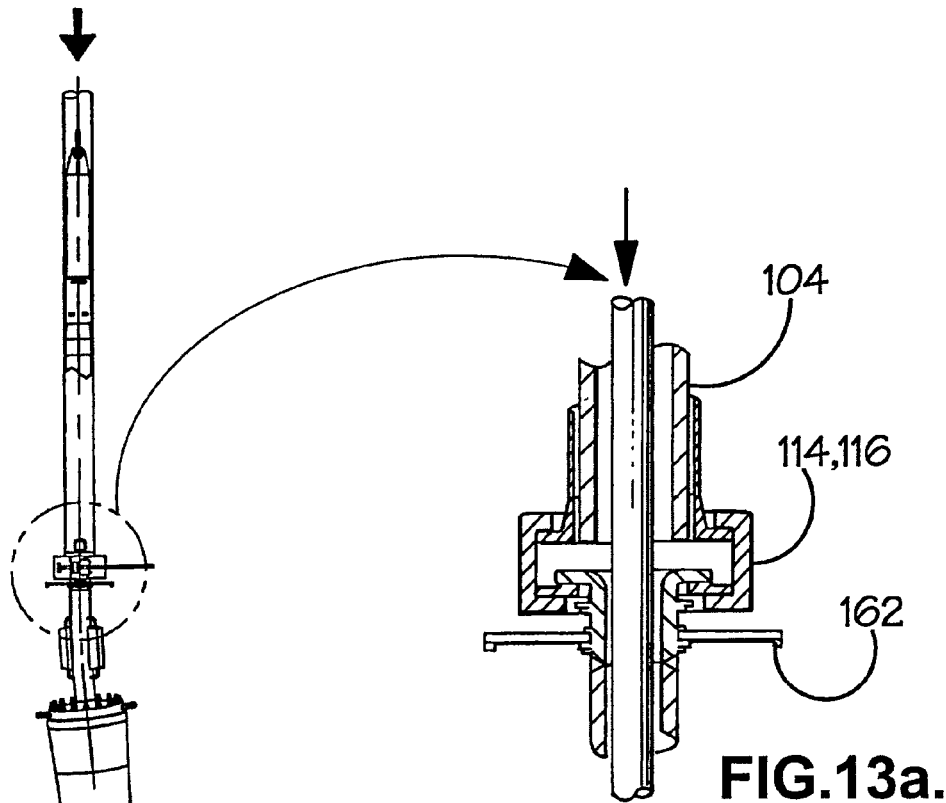
FIG.13a.
FIG.13b.

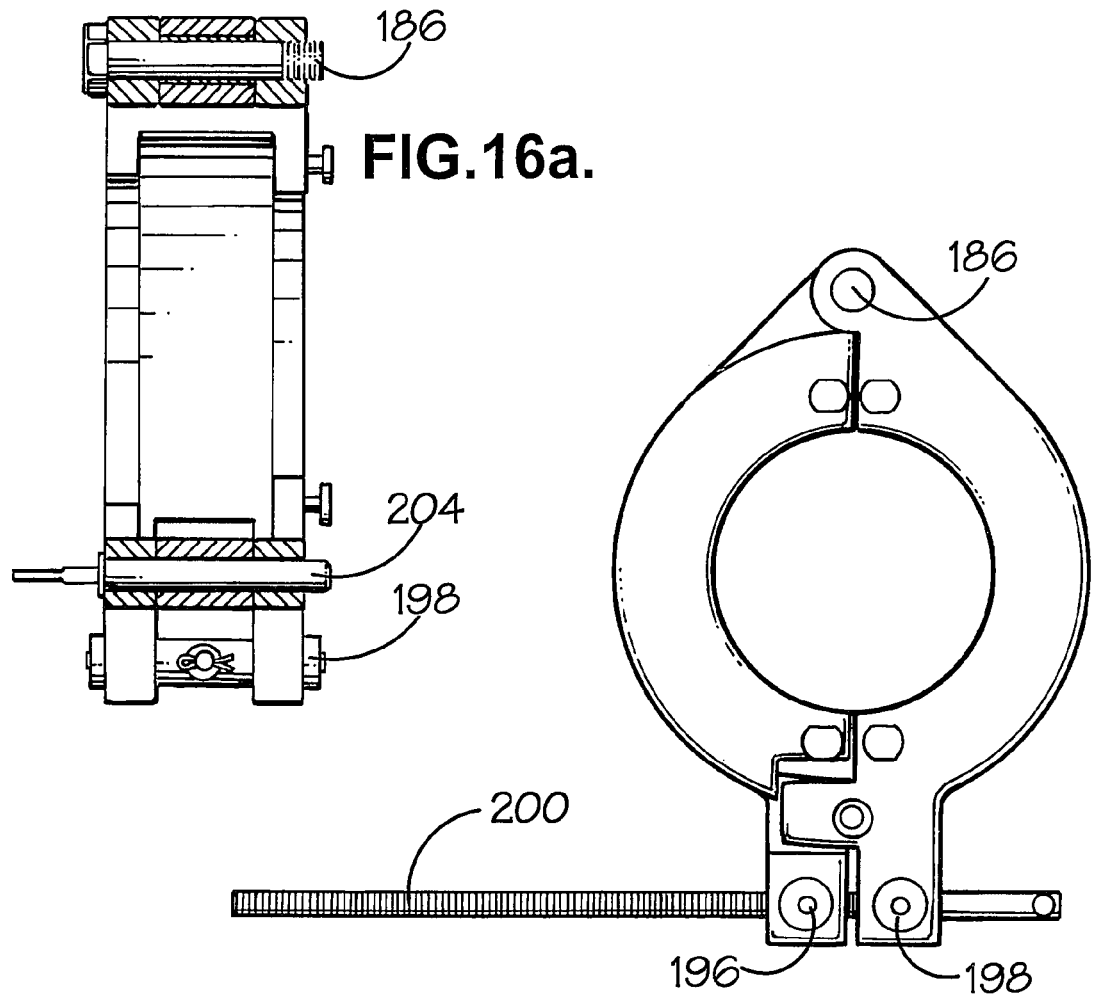
FIG.16a.
FIG.16b.
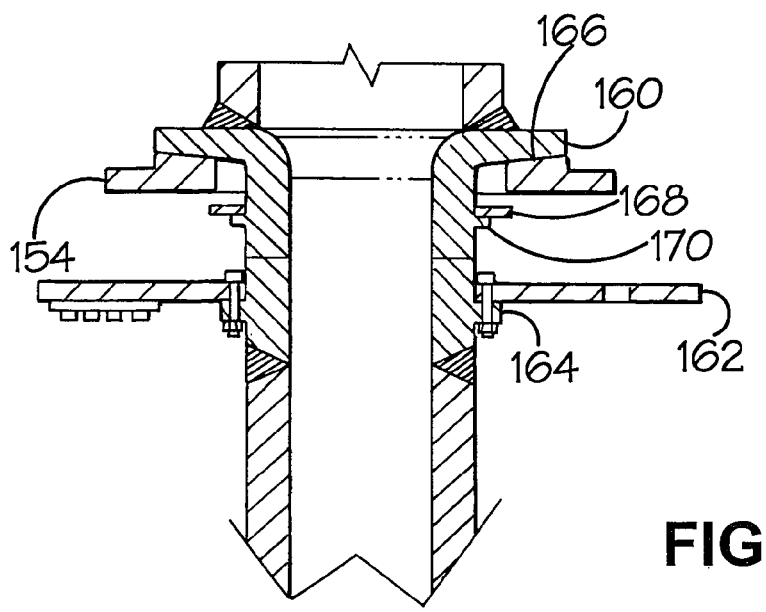
FIG.21.

SECTION B-B

SECTION C-C

BEND STIFFENER

The present invention relates to bend stiffeners and particularly to the type of bend stiffener used at a junction between a movable elongate member and a fixed tube. Such stiffeners are particularly, although by no means exclusively, used in connection with underwater risers.

When a movable underwater member is connected to some other structure such as a floating platform or seabed installation, it is often desirable to limit the flexion of the member in the region of its connection to the structure, since otherwise excessive flexion may cause damage to the member or to the connector which receives it. A specific situation of this type is found in the offshore oil extraction industry. Typically various elongate, flexible members lead from the wellhead on the seabed to the oil production platform. These include the risers used to conduct fluids to and from the wellhead. The risers themselves move, due e.g. to water currents, and where the platform is of floating type it too undergoes motion, with the result that at the junction between the riser and the platform the riser is subject to a variable bending moment, as well as variable and potentially large axial loading. There is a consequent risk of damage to the riser structure due to excessive bending and fatigue.

The bend stiffener disclosed in GB2291686 (CRP Group Ltd) serves to limit the radius of curvature of the riser in the vicinity of the junction with the platform, preventing this radius from becoming too small and so protecting the riser from damage. It comprises a sleeve formed of elastomer in the shape of an elongate truncated cone and having a through-going, cylindrical, axial cavity which receives the riser. The wider, root end of the stiffener is rigidly coupled to the platform itself to fix its orientation. The assembly of riser and elastomer body is stiff enough to ensure, when subject to design loads, that its radius of curvature—and hence that of the riser within—does not become excessively tight.

This design relies upon a rigid coupling of the root end of the stiffener to the platform. This is achieved by incorporating into the elastomer moulding a metal sleeve carrying a flange which is exposed at the end of the stiffener. When the stiffener is installed, the flange is butted against a corresponding flange formed on a fixed "I tube" carried by the platform and bolts secure the two flanges together to mount the stiffener.

While the stiffener in question has proved highly successful in practice, there are instances in which the above described manner of mounting the stiffener proves problematic, as will now be explained.

One of the major design considerations here is the fatigue life of the connection. The stresses on this part cycle with a frequency of less than one Hertz, so in its design lifetime the connection experiences millions of cycles. There is a consequent risk of fatigue and failure of the connection. This is highly undesirable both because the stiffener is a safety critical component and because of the risk of attendant damage to the riser. To maximise the fatigue life of the existing connection, the practice is to use a tensioning device to ensure that the bolts holding it together experience a chosen tension. However there are situations in which this is problematic. For example on an oil extraction platform the I tube receiving the riser may be at a water depth of the order of 150 metres. The stiffener installation must either be carried out by divers or by a remotely operated vehicle (ROV). The environment is a dangerous one for divers and use of divers is also very costly. Remotely operated vehicles are not able to carry out the required bolt tensioning. Also there are practical situations in which it is impossible for an ROV to fasten the vertically oriented bolts of the above described connection, the only possible approach to the bolts being along the horizontal direction.

There are other known arrangements for forming the connection to the stiffener. One such is referred to by the name "end fitting adjacent", in which a metal cylinder is provided at the root end of the stiffener and receives a riser end fitting as a close fit. Flanges on the mating parts are again bolted together to secure the connection but here the mating end fitting and cylinder are intended to bear at least part of any bending load. In another such arrangement the stiffener has an external metal sleeve which is inserted into an accurately manufactured cylinder attached to the I tube carried by the platform. Flared ends of the sleeve and cylinder are in this known arrangement coupled together by latches and again bending loads are at least partly borne by the mating cylindrical parts. However these types of arrangement rely of course upon a close fit between these mating parts, failing which the bending load would be borne instead by the bolts or latches used to hold the connection together. Sub-sea I tubes are subject to marine fouling and typically to relatively large manufacturing tolerances, so that it is often not practical to directly connect a stiffener to the I tube in this way. The above described arrangements do not in fact connect directly to the I tube. Instead a precisely machined cylinder is coupled to the end of the I tube and receives the mating part. However the problem of forming the actual connection to the I tube remains.

There are also existing stiffener connections which use an annular collar formed by two "C" shaped components to couple together flanges on the stiffener and I tube. The collar is assembled around the flanges which are sandwiched between a pair of radially inwardly projecting walls of the collar and so retained together. Fatigue life is again a crucial design issue with this arrangement.

An object of the present invention is to provide a bend stiffener with an improved means of connection to a tube.

In accordance with the present invention there is a bend stiffener for preventing excessive bending of a movable elongate member in a region where it enters a tube, the bend stiffener comprising an elongate stiffening sleeve having a through-going cavity for receipt of the elongate member, and means for mounting the sleeve with respect to the tube comprising a mating part which is receivable by the tube and an arrangement for locating the bend stiffener axially with respect to the tube, characterised in that the locating arrangement is formed such that it is able to accommodate some angular movement of the bend stiffener relative to the tube, so that in use axial loading on the bend stiffener is borne by the coupling arrangement and bending moments are borne by virtue of engagement of the mating part with the tube.

By permitting the axial locating arrangement freedom of angular movement, this arrangement is relieved of the bending moments applied to the sleeve. Consequently problems of fatigue of this arrangement are alleviated.

Preferably the mating part is a male projection for insertion into the tube. This arrangement is suited to use with a conventional type of coupling tube having a flange at its exterior. Nonetheless it would be possible to use a female mating part for receipt over a tube. Still more preferably the mating part is a cylinder with an axial through-going cavity. Other such embodiments could use some other shape of member whose periphery describes a cylindrical locus, e.g. by virtue of a set of radially projecting fins. In such an embodiment the elongate member can be passed all the way through the bend stiffener via the sleeve and the mating part and so extend into the tube.

In a particularly preferred arrangement, the locating arrangement comprises a multi-part or expansible collar. The locating arrangement preferably further comprises a flange connected to the sleeve, the collar being shaped to surround and engage with the flange to locate it axially with respect to the tube. Circumferential extending bolts or studding can be provided for closing the collar, making assembly of the coupling particularly convenient.

In a particularly preferred embodiment the collar's radially innermost surface is shaped to provide a part-spherical seat and an inwardly projecting lip, the locating arrangement further comprising a flange having a part-spherical bearing surface arranged to bear upon the seat to transmit axial loading from the sleeve to the collar while permitting angular displacement, and the collar being able to be closed around a flanged end of the aforementioned tube to axially locate the bend stiffener relative to it, the collar's lip engaging with the tube's flange to transmit axial loading to the tube.

Specific embodiments of the present invention will now be described, by way of example only, with reference to the accompanying drawings in which:

FIG. 1 is a perspective illustration of a bend stiffener assembly according to a first embodiment of the present invention, and an I tube upon which the stiffener is to be mounted, the parts being shown as arranged prior to assembly;

FIG. 2 shows the same parts and arrangement as FIG. 1 but viewed along a radial direction;

FIG. 3 is a section through the same arrangement of parts along the line A-A of FIG. 2;

FIG. 4 is a perspective illustration of the same parts at an intermediate stage in the assembly process;

FIG. 5 shows the same arrangement as FIG. 4 but viewed along a radial direction;

FIG. 6 is a section through the same arrangement along the line A-A of FIG. 5;

FIG. 7 is a perspective illustration of the stiffener/I tube assembly at a subsequent stage in the assembly process;

FIG. 8 is an axial section through the arrangement illustrated in FIG. 7;

FIG. 9 is an axial section through the completed assembly;

FIG. 10 is a perspective illustration of a pair of I tubes, on one of which is mounted a bend stiffener assembly according to a second embodiment of the present invention, a collar forming part of the bend assembly being shown in a closed configuration;

FIG. 12 is a partly sectional illustration of the same I tube and bend stiffener assembly illustrated in FIGS. 10 and 11;

FIGS. 13a and 13b are enlarged sectional illustrations of a coupling assembly by which the bend stiffener assembly is coupled to the I tube, the collar thereof being shown in its closed configuration;

FIGS. 16a and 16b are respectively (a) a section in an axial plane, and (b) a view along the axial direction, of the collar in its closed configuration;

FIG. 21 is an enlarged section through a flange arrangement forming part of the tube assembly of FIGS. 17-20.

Figure 11:
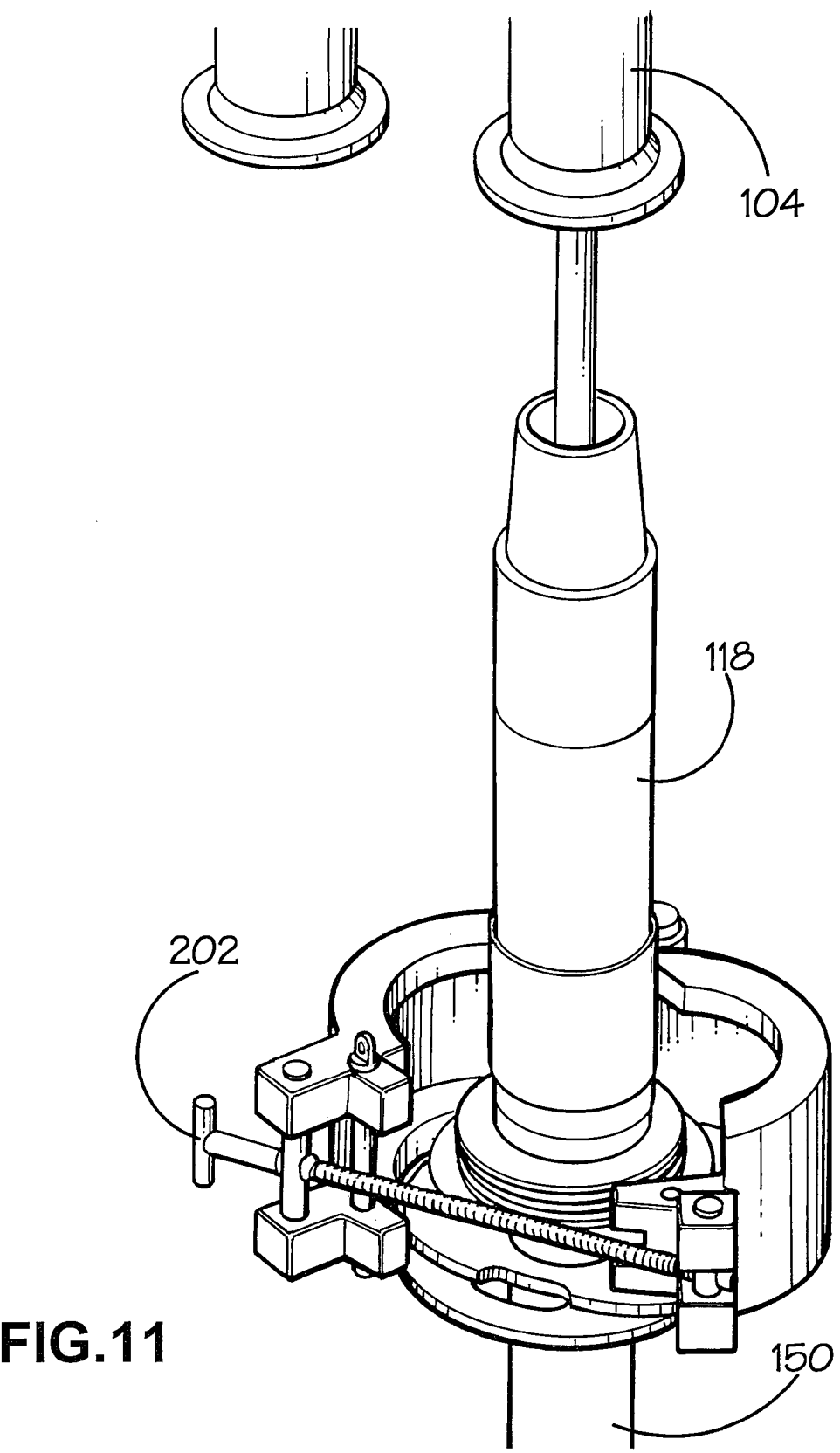
FIG. 11 is a perspective illustration of the same I tube and bend stiffener assembly illustrated in FIG. 10, but shows the collar in an open configuration.

FIGS. 1 to 9 show a bend stiffener according to a first embodiment of the present invention, which serves to stiffen a sub sea riser in the region where it is received by a tube 4 mounted upon some form of platform such as an oil extraction platform. The riser itself is omitted from the drawings but it is to be understood that it passes through both the bend stiffener assembly 2 and the tube 4, and is formed as a tube of circular section. The riser may, e.g. in hydrocarbon extraction, be of large diameter and substantial construction. Nonetheless it must be regarded in this context as being flexible, due to the large loads applied to it and its considerable length.

The tube 4 will be referred to below as an I tube, the conventional name for a vertical, platform-mounted tube for receiving the riser. Its lower end carries a fixed flange 6 used to couple to the bend stiffener assembly 2. There are other types of tube used to receive risers. In particular where the riser is not vertical where it enters the tube, a so-called "J" tube can be used to accommodate the riser inclination. The I tube of this embodiment is a substantial metal component. As hereinbefore explained it may be mounted at large sub-sea depth and may in practice be subject to marine fouling, as well as significant manufacturing tolerances in its dimensions.

The bend stiffener assembly 2 comprises an elongate sleeve 8 which has a frusto-conical exterior shape. The drawings do not show the sleeve 8 in section but FIG. 3 indicates in phantom a through-going cylindrical passage 10 within the sleeve, through which the riser passes. The sleeve is in this embodiment formed of moulded elastomer. Polyurethane is the preferred material. Its shape and dimensions are determined with reference to in-service loads to ensure that the riser within does not experience bending with an excessively small radius of curvature.

The sleeve 8 is mounted at the lower end of the I tube 4 by means of a coupling assembly which comprises a shaped mounting flange 12 and a two part collar 14, 16. The sleeve 8 also carries a locating cylinder 18. All of these components are in the present embodiment formed of metal.

The mounting flange 12 is rigidly joined to the broader, root end of the sleeve 8 by means of bolts 20. This is a critical connection which bears bending load but these parts can be assembled onshore and the bolts can consequently be pre-tensioned as necessary without difficulty. Mounting flange 12 is circular and co-axial with the sleeve 8 and its undersurface is shaped to provide a part-spherical bearing surface 22. The upper face of the mounting flange has a circular recess 24.

The locating cylinder 18 is rigidly joined to the mounting flange 12 and is co-axial with it, projecting from the flange in a direction away from the sleeve 8. Its exterior diameter is chosen to enable it to be inserted into the I tube 4. However in accordance with the present invention it is not necessary for the cylinder 18 to make a close fit in the I tube. Instead the cylinder has significant clearance, to enable its insertion despite marine fouling and/or dimensional tolerance of the I tube. The cylinder 18 terminates in an inclined shoulder 26 which facilitates its introduction to the I tube 4, tolerating small initial misalignments. In the present embodiment it has a double walled construction and it is inner wall 26 which is joined to the mounting flange 12 and which is sized to receive the riser, exterior wall 28 being sized for receipt by the I tube.

The collar is annular when assembled but is split along a plane containing its axis to form two "C" shaped components 14,16. In axial section (e.g. FIG. 3) the collar's radially inner face is seen to be cut away to form a part-spherical seat 30 running into a radially inwardly projecting lip 32. Means are required for securing the two collar parts 14,16 together and in the present embodiment these take the form of tangentially oriented bolts 34. One of a number of alternatives would be to pass a tension strap around the entire collar.

The drawings show four different stages in the process of mounting the stiffener upon the I tube. The process is in this example carried out underwater. The first of these stages is illustrated in FIGS. 1 to 3. The bend stiffener is generally axially aligned with, but separated from, the I tube. The riser, as noted above, is not shown in the drawings but it should be understood that at this stage it passes though both the I tube and the stiffener. The collar 14,16 is assembled but bolts 34 are unscrewed to separate the two parts of the collar. Consequently there is sufficient clearance for the fixed flange 6 to be introduced between the lips 32. Cables 36 are led through the I tube from remote winches (not shown) to mounting lugs 38 at the upper end of the cylinder 18, being connected to the lugs through shackles 40 which incorporate shear pins. Such shackles are well known in the art.

By use of the winches the cylinder 18 is drawn into the I tube 4 to reach the stage of assembly illustrated in FIGS. 4 to 6. The I tube's fixed flange 6 has passed between lips 32 and seated in the recess 24 of the mounting flange 12. Note that although bolts holes are shown passing through the fixed flange 6 (since the I tube shown is of a conventional type manufactured for use with a bolted connection to the stiffener) these do not receive bolts and are not used. The operators can establish when the flange 6 is seated by virtue of the increase in cable tension which results. Additionally or alternatively the process may be observed, e.g. by use of an ROV.

In FIG. 7 an arm 42 is shown in the process of tightening one of the bolts 34 to draw together the two collar parts 14,16. Note that the arm can approach the bolt along a horizontal direction, facilitating use of an ROV for this operation. Once the collar halves are drawn together by the bolts (as seen in FIGS. 7 and 8) the lips 32, whose internal diameter is smaller than the external diameter of the fixed flange 6, prevent withdrawal of the I tube from the collar. In this way the stiffener is axially located with respect to the tube, although slight axial motion of the stiffener is possible due to clearances between the connecting parts.

It is then necessary to release the cables 36 and this can be done by increasing the winch tension to break the shear pins of the shackles 40. Comparing FIGS. 8 and 9 it can be appreciated that once the cable tension is removed from the stiffener it falls slightly. FIG. 9 shows the positions which the parts consequently adopt. The weight of the stiffener is transmitted to the collar 14,16 through abutment of the part-spherical surface 22 and seat 30. These surfaces together form what can be thought of as a universal coupling, albeit one with a very limited range of angular movement. Note that there is clearance between the mounting flange 12 and the lips 32 to accommodate such angular movement. The weight of the stiffener is transmitted from the collar to the I tube through abutment of the fixed flange 6 and the lips 32. Clearance between the outer circumference of the fixed flange 6 and the inner face of the recess 24 ensures that these parts can again undergo small relative angular motion.

The result is a coupling which locates the stiffener along the axial direction and so bears its weight, but does not itself prevent the root of the stiffener from undergoing some angular motion. Such angular motion is instead limited by the fit of the locating cylinder 18 within the I tube 4. Despite the clearance which the cylinder 18 has within the I tube, the design is such that as the bend stiffener undergoes angular motion the cylinder 18 will always "lock up" within the I tube before the coupling arrangement reaches the end of its available angular motion. Hence the axial coupling arrangement 6,12,14,16 is not required to withstand any significant bending load. The illustrated design thus allows the different loads on the stiffener to be isolated from one another. Axial loads (due mainly to the stiffener's weight, and hence relatively small) are borne by the axial coupling parts. Bending loads (created by the riser itself, and potentially large) are borne by the locating cylinder 18 within the I tube 4.

Due to its isolation from the bending loads, the axial coupling is subject to relatively light loading. Fatigue in this region is consequently not a problem. The measures used in other arrangements to counter fatigue—such as bolt tensioning in situ—can in some instances consequently be dispensed with, making underwater installation more straightforward. Fatigue life can potentially be improved. The invention also makes in situ installation of the bend stiffener particularly convenient. There are no loose parts in the arrangement as it is delivered to the vicinity of the I tube: the collar itself and all of the associated bolts are captive and so cannot be lost. The bolts can be approached horizontally, rather then vertically as in the earlier couplings. The arrangement is at least partly self aligning and is in any event inherently tolerant of slight misalignment. Consequently while it has been developed in an environment where loading and physical dimensions are large—since oil and gas extraction risers are large components—the present invention is thought to be potentially applicable to other situations where convenience of installation is beneficial.

The second embodiment, illustrated in FIGS. 10 to 21, differs from the first in the following main respects:
  i. the collar 114, 116 is formed as a hinged assembly, further simplifying the process of closing the collar underwater;
  ii. bend stiffener assembly 102 comprises an extension tube 150 by which sleeve 108 is separated from the assembly 152 coupling the bend stiffener assembly to the I tube 104; and
  iii. the seat portion of the universal coupling between the I tube 104 and the bend stiffener assembly 102 is formed by means of a seat plate 154, and not the collar 114, 116 itself.

These and other aspects of the second embodiment will now be described in detail.

A tube assembly of the present embodiment is best seen in FIGS. 17-21, and comprises inter alia the extension tube 150 and locating cylinder 118. To accommodate inclination of the riser to the vertical, where it enters the bend stiffener assembly, the extension tube 150 is slightly curved (see FIG. 18). Consequently mounting flange 112, welded to the lower end of the extension tube 150, is inclined, as too is the frusto-conical, elongate sleeve 108, secured to the mounting flange 112 as in the first embodiment, by means of multiple pre-torqued bolts. Anodes 156 at the exterior of the extension tube 150 help to reduce electrolytic degradation in salt water. Welded to the top end of the extension tube 150 is an upper tube portion 158 terminating in an integral locating flange 160. The locating cylinder 118 is welded to, and co-axial with, the upper tube portion 158. As in the first embodiment, the locating cylinder 118 has a diameter which enables it to be received in the I tube 104, and a frusto-conical upper region 126 which facilitates insertion. Referring in particular to FIG. 21, a generally circular collar retaining plate 162 is received upon the upper tube portion 158, which has an integral stub flange 164 to which the collar retaining plate 162 is bolted. Also received upon the upper tube portion 158 is the seat plate 154, formed as a circular ring with an upwardly facing seat surface 166 whose shape is part of a notional sphere. The seat plate 154 is captive between the locating flange 160 and a retaining ring 168, which itself is located by a second stub flange 170, integrally formed with the upper tube portion 158.

Figure 14A:
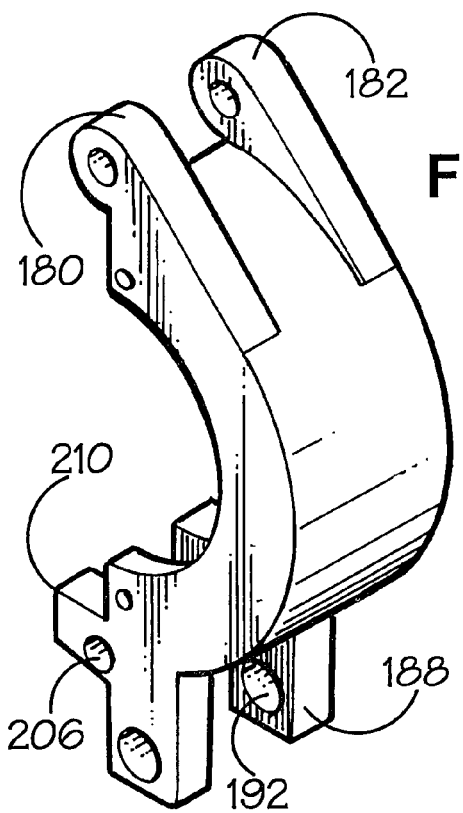
FIGS. 14a and 14b are perspective illustrations, from the front and rear respectively, of one component of the collar.
Figure 14B:
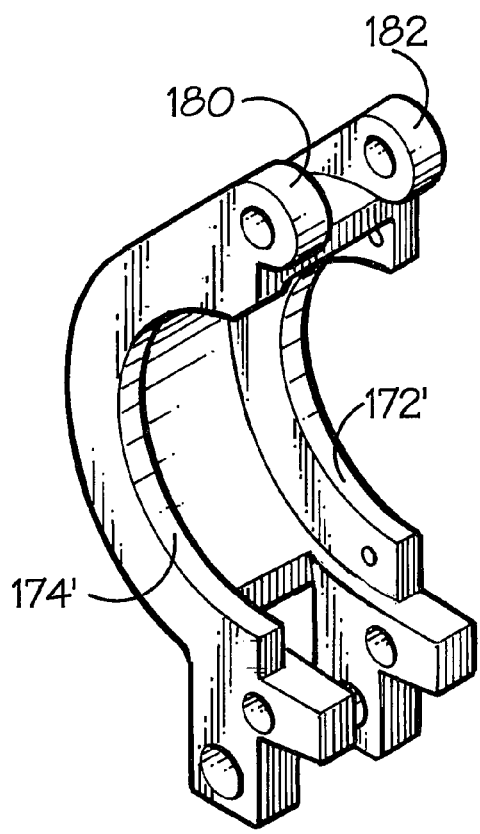
Figure 15:
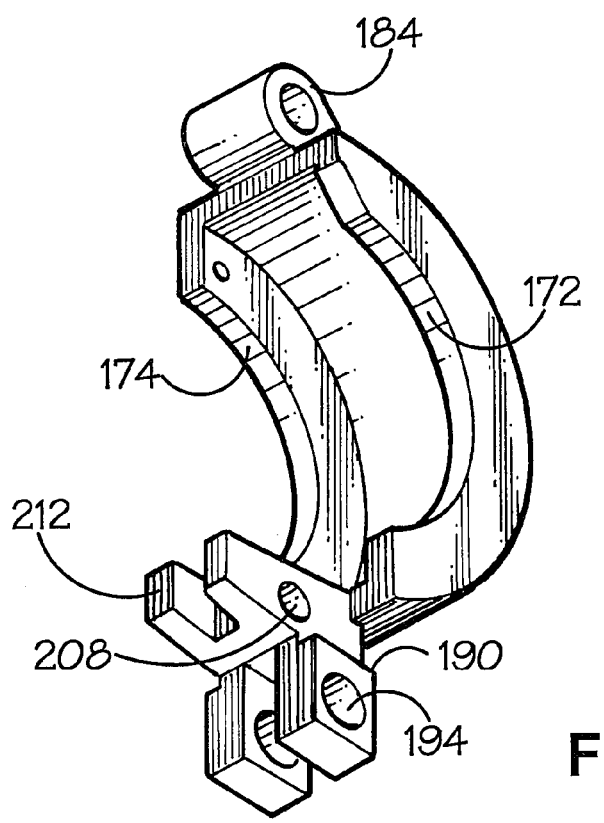
FIG. 15 is a perspective illustration of another component of the collar.
Figure 19:
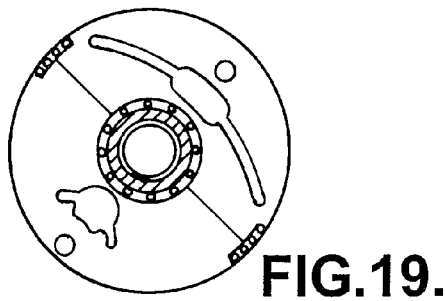
FIG. 19 is a section along the lines B-B of FIG. 17.
Figure 20:
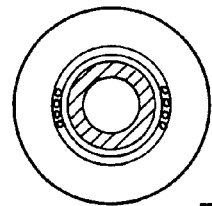
FIG. 20 is a section along the lines C-C of FIG. 17.
Figure 17:
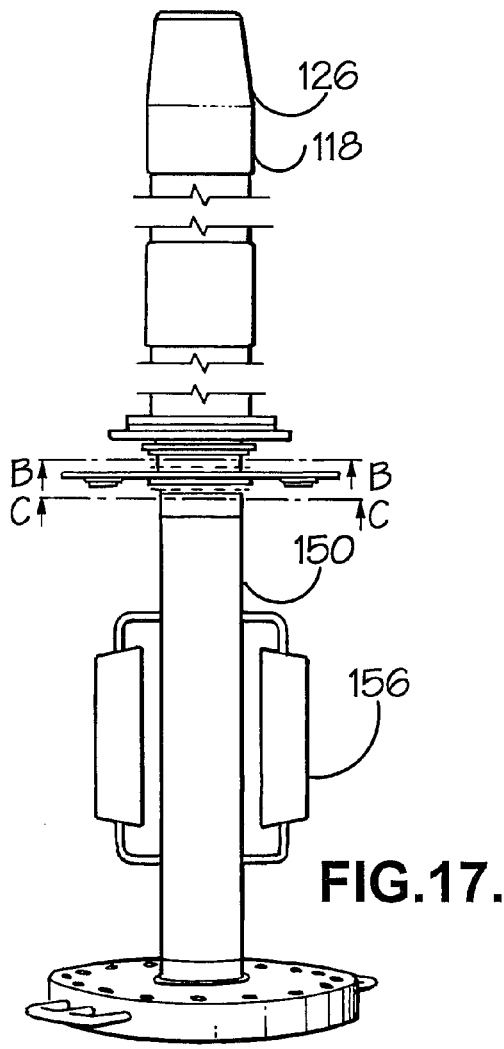
FIG. 17 is a side elevation of a tube assembly forming part of the bend stiffener assembly illustrated in FIGS. 10-12.
Figure 18:
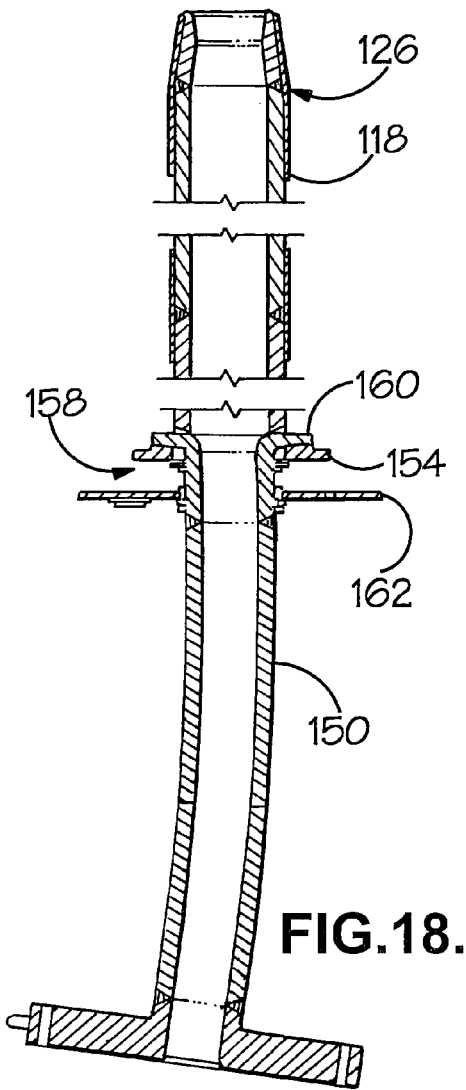
FIG. 18 is a section through the tube assembly in an axial plane.

Turning to FIGS. 14 to 16, the collar of the present embodiment comprises two generally "C" shaped halves 114, 116 formed as cast metal components, and both having inwardly directed semi-circular upper and lower lips' 172, 172', 174, 174'. Collar part 114 has a pair of hinge lugs 180, 182, between which is received a further hinge lug 184 of collar part 116. A hinge pin 186 (FIG. 16) passed through aligned bores in the lugs couples the two collar halves together in hinged manner. At those ends remote from the hinge lugs, both collar parts 114, 116 have a respective pair of crossbar-receiving lugs 188, 190, each having aligned bores 192, 194 which receive captive but rotatable crossbars 196, 198. A tensioning screw 200 is passed through transverse bores in the crossbars 196, 198, and is threadedly received by the bore in crossbar 196, so that the free ends of the two collar parts can be separated or drawn together simply by turning the tension screw, which has a "T" shaped end 202 (see FIG. 11) which can straightforwardly be engaged and turned by use of a remotely operated vehicle. When the collar is closed, as in FIG. 16, a locating pin 204 is able to drop through aligned locating bores 206, 208 formed in interfitting loctating lugs 210, 212 of the two collar parts.

FIG. 11 shows the bend stiffener assembly immediately prior to its mounting upon I tube 104. The collar 114, 116 is open, ready to receive fixed flange 106 of the I tube, and is supported upon the collar retaining plate 162. FIGS. 12 and 13 show the mounted bend stiffener, after locating cylinder 118 has been drawn into the I tube 104 and the collar has been closed by turning tension screw 200. Inner faces of the lips 172, 174 of the collar abut with the I-tube's fixed flange 106 and with the seat plate 154 to prevent axial withdrawal of the assembly from the I tube. As in the previous embodiment, some rotational movement is permitted by the resulting coupling, ensuring that it carries axial loading but that bending moments are borne by engagement of the locating cylinder 118 in the I tube 104. By virtue of the provision of the seat plate 154, axial loading does not tend to force the collar halves apart.

The above embodiment is presented by way of illustration rather than limitation and numerous modifications and adaptations are possible in implementing the invention as claimed. For example, while the embodiment has been described with respect to a junction between a marine riser and a surface platform, bend stiffeners embodying the invention could of course be deployed at the sea-bed end of risers, or indeed in connection with any elongate, flexible member deployed in water and requiring bend restriction in the region where it meets some other structure. The form of coupling used to locate the bend stiffener along its axial direction could take any number of different forms. For example the part-spherical seat bearing surface could be omitted. The form of the rotating part received upon the I tube need not be cylindrical: another option would be to use a member with radially projecting fins, with their outer peripheries upon a cylindrical locus, to engage the I tube interior.

What is claimed is:

1. A marine bend stiffener for preventing excessive bending of a movable elongate member in an underwater region where it enters a tube, the bend stiffener comprising an elongate flexible sleeve having a through-going cavity for receiving and embracing the elongate member to permit some motion thereof while preventing the elongate member from being excessively tightly curved, and an arrangement for mounting the sleeve with respect to the tube, the mounting means arrangement comprising a tubular mating part which is rigidly coupled to a root end of the sleeve and is one of (a) insertable coaxially into the tube and (b) receivable coaxially upon the tube, and a locating arrangement for locating the bend stiffener axially with respect to the tube, the locating arrangement being formed such that the locating arrangement permits the mating part to turn freely through a limited angular range relative to the tube, so that in use axial loading on the bend stiffener is borne by the coupling arrangement and bending moments are born by virtue of engagement of the mating part with the tube.

2. A bend stiffener as claimed in claim 1 wherein the locating arrangement is adapted to permit the bend stiffener to be installed in situ upon fixed tube.

3. A bend stiffener as claimed in claim 1 wherein the locating arrangement comprises abutting surfaces, through which axial load is transmitted, which are of part spherical shape and are thereby adapted to accommodate relative angular displacement.

4. A bend stiffener as claimed in claim 1 wherein the locating arrangement comprises a multi-part or expansible collar.

5. A bend stiffener as claimed in claim 4 wherein the locating arrangement further comprises a flange connected to the sleeve, the collar being shaped to surround and engage with the flange to locate it axially with respect to the tube.

6. A bend stiffener as claimed in claim 4 wherein the collar is circular and is provided with an arrangement comprising substantially circumferentially extending studding or bolts for closing the collar.

7. A bend stiffener as claimed in claim 4 wherein the collar's radially innermost surface is shaped ~to provide a part-spherical seat and an inwardly projecting lip, the locating arrangement further comprising a flange having a part-spherical bearing surface arranged to bear upon the seat to transmit axial loading from the sleeve to the collar while permitting angular displacement, and the collar being able to be closed around a flanged end of the aforementioned tube to axially locate the bead stiffener relative to it, the collar's lip engaging with the tube's flange to transmit axial loading to the tube.

8. A bend stiffener as claimed in claim 4, wherein the collar comprises two hingedly coupled parts.

9. A bend stiffener as claimed in claim 1, which is for use with an underwater tube.

10. A bend stiffener as claimed in claim 1 which is for use with a marine riser.

* * * * *